Patented July 26, 1932

1,868,838

UNITED STATES PATENT OFFICE

JOHN McINTYRE, OF PORTOBELLO, SCOTLAND

SHAVING PREPARATION

No Drawing. Application filed June 16, 1930, Serial No. 461,647, and in Great Britain April 16, 1930.

The invention relates to preparations for use in shaving and comprises a new or improved preparation for the purpose which possesses, inter alia, the advantage that no lathering is required.

A shaving preparation according to the invention is obtained by boiling linseed, (i. e. flaxseed) in water. This gives a mucilaginous liquid or base which in itself forms a useful preparation for use in shaving, but which will not keep for any length of time. I, therefore, prefer to add to the liquid or base, obtained as above, a small quantity of caustic soda, or of ammonia, or of both, together with a suitable scent to give to the preparation a pleasant odor and to disguise the odor of the caustic soda and/or ammonia. Oil of peppermint, dissolved in eau de Cologne or preferably in pure alcohol, forms a very suitable scent and creates a pleasant cool feeling on the skin.

As an example of the practical production of the preparation, one dessert-spoonful of clean linseed is boiled with 1¼ pounds of water for 1¼ hours. The resulting mucilaginous liquid is then strained from the seeds and allowed to cool. About half a small teaspoonful of caustic soda is dissolved in half a cupful of cold water and gently stirred into the liquid. A few drops of ammonia and of oil of peppermint (dissolved in eau de Cologne or alcohol) are then added and the whole gently stirred. The preparation is then ready for bottling and will keep for a long period.

If a thicker preparation is required, the quantity of linseed employed may be increased.

In using the preparation, the face is wetted with water and a small quantity of the preparation smeared on. Shaving may then proceed, and it will be found that results are obtained far better than can be obtained when saponaceous preparations are employed. A small amount of the liquid may be poured out into the palm of the hand, and rubbed onto the face, which will leave a thin film of the liquid preparation on the face, then shaving may be proceeded with in the customary manner. The most stubborn beard can be removed from the tenderest skin without producing or leaving a trace of soreness, the preparation forming in fact an excellent lotion to remove any soreness which may be present.

If too much caustic soda and/or ammonia is or are added to the base the skin will "nip" after shaving, and the quantities of these ingredients require, therefore, to be carefully limited. The same holds good of peppermint oil if used as a scent.

Any other suitable harmless agent or substance which will prevent or delay decomposition of the base may be substituted for caustic soda and/or ammonia and, as before mentioned, though exhaustive experiment has shown that a preparation made from this seed gives the best results.

Having thus described the invention, what is claimed as new is:

An improved self-contained shaving preparation consisting of a mucilaginous, aqueous liquid composed of water containing those constituents of linseed which are soluble in boiling water, of such a consistency as to leave a thin liquid film on the face, and a small quantity of a free alkali selected from the class consisting of caustic soda, ammonia and mixtures thereof.

In testimony whereof I hereunto affix my signature.

JOHN McINTYRE.